UNITED STATES PATENT OFFICE.

GUSTAF WALFRID PETERSSON, OF STOCKHOLM, SWEDEN, ASSIGNOR OF ONE-HALF TO LOUIS WILHELM ALWIN JACOBI, OF SAME PLACE.

METHOD OF MANUFACTURING BRIQUETS OF IRON ORES OR IRON COMPOUNDS.

SPECIFICATION forming part of Letters Patent No. 585,591, dated June 29, 1897.

Application filed November 17, 1896. Serial No. 612,401. (No specimens.)

*To all whom it may concern:*

Be it known that I, GUSTAF WALFRID PETERSSON, a subject of the King of Sweden and Norway, and a resident of Stockholm, Sweden, have invented certain new and useful Improvements in the Manufacture of Briquets of Iron Ores or Iron Compounds, of which the following is a specification.

This invention relates to the formation of pulverized or crushed iron ores or other compounds containing iron into blocks or briquets to better adapt the material for reduction to metallic iron. It is far more advantageous in the reduction of such ores to the metallic state to have the ore in the form of blocks or briquets, mainly because of the advantage such briquets afford for proportioning the composition of the charge, and especially with reference to the addition of charcoal. Moreover, the formation of the ore into briquets facilitates and lessens the cost of transportation, and this is important where the reduction of the ore is effected at some distance from the mine.

In carrying out my invention the pulverized or crushed ore or compound containing iron is first subjected to the action of a reducing agent and the reducing process arrested after a part of the mass has been reduced to the condition known as "iron sponge." The mass is then formed into blocks or briquets by pressure or blows, the iron sponge formed in the partial reduction serving as a binding agent to cause the mass to cohere.

The partial reduction of the iron in the mass may be effected by any known means—as, for example, by reducing-gases or pulverized carbonaceous matter, as charcoal—and it may be effected in either a stationary or portable furnace.

The partially-reduced mass, after being cooled down to a suitable temperature, may and preferably will be exposed to the action of water or steam, either alone or combined with carbonic acid, acetic acid, and the like, whereby hydrates or salts of iron are formed, which serve also as binding agents in the formation of the briquets from the mass.

It will be understood that by my process the effect is not to bring the metal to a molten state either wholly or partially, all the constituents of the ore in the briquets remaining unchanged except that a portion of the oxidized iron present in the ore is transformed into a sponge of malleable iron, which forms the medium by which the particles of ore are welded together.

I am aware that it is not new to form briquets by actual fusion of the metal; but this I do not claim.

Having thus described my invention, I claim—

1. The herein-described method of forming briquets from pulverized or crushed iron ore or other similar compound containing iron, which consists in first partially reducing the ore to form iron sponge, and then compressing the mass into blocks or briquets of the desired size and form.

2. The herein-described method of forming briquets from pulverized or crushed iron ore or other similar compound containing iron, which consists in subjecting the mass to a reducing agent and arresting the reduction when the mass has been partly reduced to iron sponge, then exposing the mass to the action of water, and finally subjecting the mass to pressure to form blocks or bricks of the desired size and form.

In witness whereof I have hereunto signed my name in the presence of two subscribing witnesses.

GUSTAF WALFRID PETERSSON.

Witnesses:
ERNST SVANGVIST,
CARL P. GERELL.